United States Patent

Fortney

[15] 3,635,199

[45] Jan. 18, 1972

[54] ANIMAL TEMPORARY HOLDDOWN DEVICE

[72] Inventor: Neal R. Fortney, Broadview, Mont. 59015

[22] Filed: Dec. 12, 1969

[21] Appl. No.: 884,522

[52] U.S. Cl. .............................................. 119/96, 119/103
[51] Int. Cl. .............................................................. A61d 03/00
[58] Field of Search ........................... 119/96, 98, 99, 103

[56] References Cited

UNITED STATES PATENTS

| | | | |
|---|---|---|---|
| 2,520,585 | 8/1950 | Walker et al. | 119/103 |
| 2,708,422 | 5/1955 | Morrison | 119/103 |
| 2,753,842 | 7/1956 | Thorson | 119/103 |
| 2,939,425 | 6/1960 | Taylor et al. | 119/103 |

Primary Examiner—Hugh R. Chamblee
Attorney—Clarence A. O'Brien and Harvey B. Jacobson

[57] ABSTRACT

An elongated lever including structure at a first end for universal support from a stationary support and structure at the other end defining a handle. Further, the lever includes a central portion provided with animal body-embracing structure defining a recess opening outwardly of one side of the lever into which an animal body toward which the central portion is swung may be received and the lever is extendible intermediate its central portion and the first end thereof.

14 Claims, 6 Drawing Figures

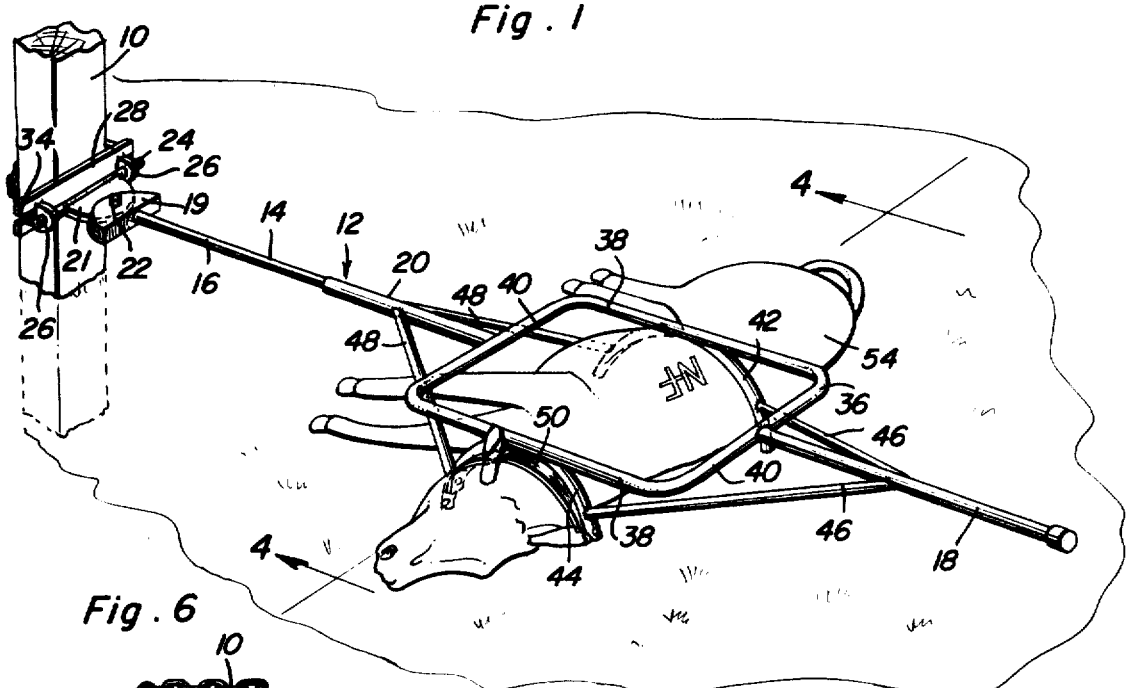
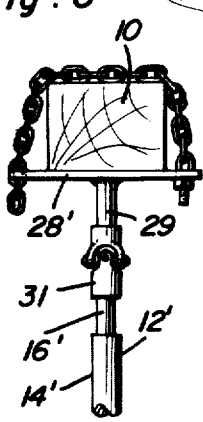
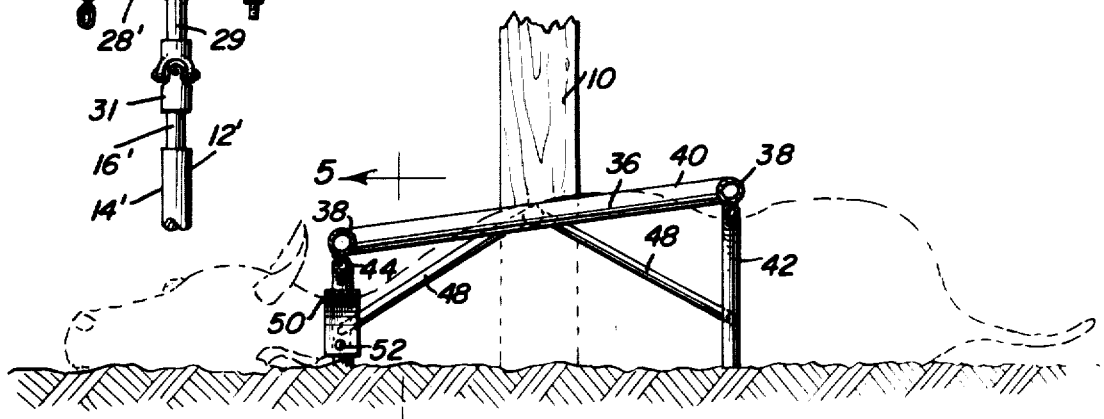
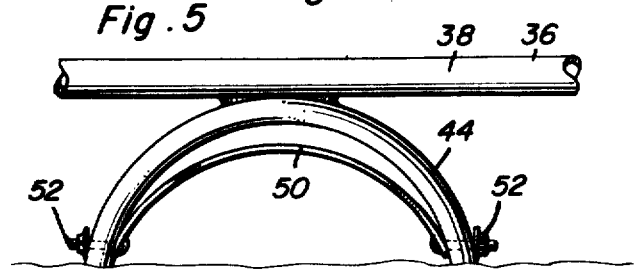
Neal R. Fortney
INVENTOR.

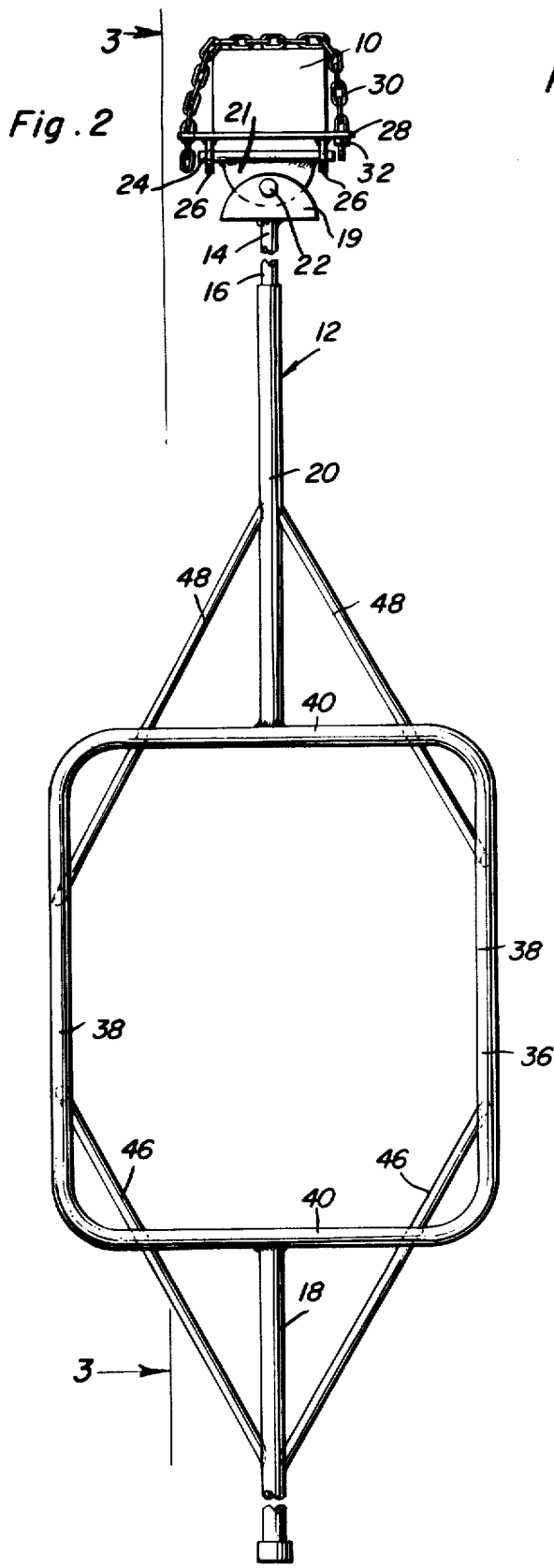
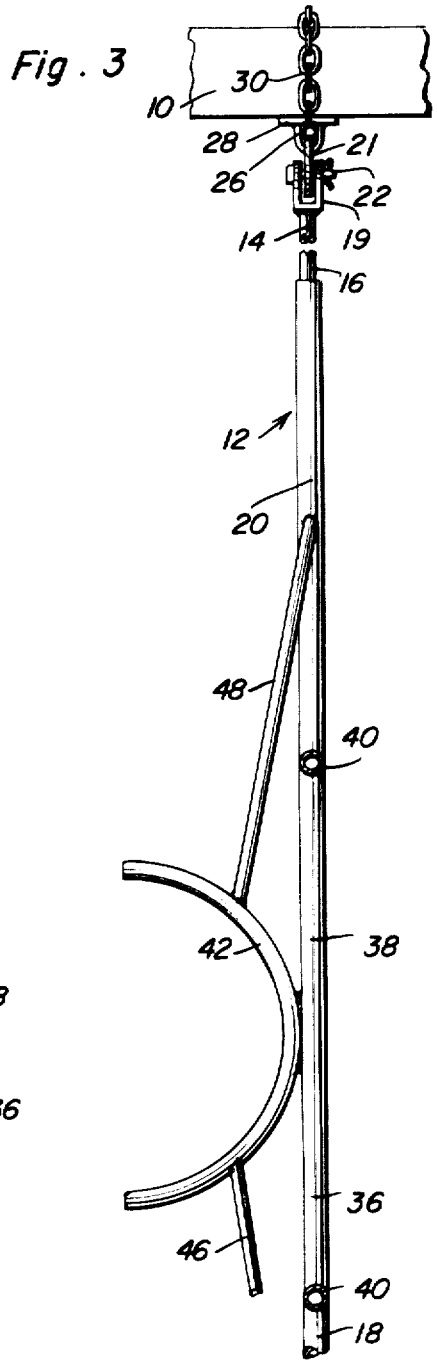
Neal R. Fortney
INVENTOR.

ANIMAL TEMPORARY HOLDDOWN DEVICE

The animal holddown device of the instant invention has been specifically designed to provide a means whereby an animal to be branded or to be innoculated may be held securely on the ground after having once been placed on the ground. Although the holddown device will be utilized primarily for holding an animal such as a calf on the ground during branding operations and possibly during innoculation of the animal, it is to be noted that the holddown device may be utilized to hold an animal on the ground in a stationary manner for various other purposes besides branding and innoculation.

The holddown device comprises an elongated lever having relatively rotatable and extendible opposite end portions. One terminal end of the lever includes means whereby it may be universally attached to a suitable support adjacent the ground and the other terminal end of the lever defines a handle. The end portion of the lever upon which the handle is defined also defines a laterally opening cradle which may be swung downwardly toward an animal disposed on the ground for embracingly engaging the upper surface portions of the animal and retaining the animal upon the ground when a downward force is applied to the handle.

Inasmuch as animals to be branded or innoculated cannot be precisely placed on the ground where desired, the end portion of the lever from which the cradle is supported is relatively rotatable and extendible in relation to that end of the lever universally attached to a suitable support. In this manner, the cradle portion of the lever may be readily precisely positioned relative to the animal on the ground which is to be held on the ground during branding or innoculation operations.

It is the main object of this invention to provide a holddown device for animals which may be utilized to hold an animal stationary on the ground during branding and/or innoculation operations.

Another object of this invention, in accordance with the immediately preceding object, is to provide a holddown device whose portion to be engaged with the animal to be held on the ground may readily adjusted relative to an anchor for the holddown device and the animal to be held on the ground in order that the portion to be engaged with the animal may be properly positioned relative to the animal.

Another important object of this invention is to provide an animal holddown device which may be readily utilized by a single person to hold an animal in stationary position on the ground.

A final object of this invention to be specifically enumerated herein is to provide an animal holddown device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the animal holddown device illustrated in use holding an animal in stationary position upon the ground;

FIG. 2 is a top plan view of the assemblage illustrated in FIG. 1 and on somewhat of an enlarged scale;

FIG. 3 is a longitudinal vertical sectional view taken substantially upon the plane indicated by section line 3—3 of FIG. 2 and with portions of the holddown device being broken away;

FIG. 4 is a fragmentary enlarged vertical sectional view taken substantially upon the plane indicated by the section line 4—4 of FIG. 1;

FIG. 5 is a fragmentary enlarged vertical sectional view taken substantially upon the plane indicated by the section line 5—5 of FIG. 4; and FIG. 6 is a fragmentary top plan view of a modified form of holddown device.

Referring now more specifically to the drawings the numeral 10 generally designates a suitable ground-mounted support in the form of a post to which the holddown device of the instant invention is secured. The holddown device is generally referred to by the reference numeral 12 and includes an elongated lever 14 having opposite end portions 16 and 18. The end portion 18 includes a tubular member 20 rotatably telescoped over the free end of the end portion 16. The end portion 16 comprises a cylindrical member and its base end includes a pair of laterally spaced mounting plates 19 between which a third mounting plate 21 is pivotally secured by means of a pivot fastener 22. The third plate 21 is supported from the midportion of a pivot pin 24 journaled through a pair of apertured mounting ears 26 carried by a mounting plate 28 which is secured to the post 10 by means of a link chain 30 having one end secured to one end of the plate as at 32 and the remote end portion anchored in a slot 34 formed in the other end of the plate 28. Thus, the base end of the end portion 16 is universally supported from the post 10. The tubular member 20 has a central portion thereof removed and replaced by a rectangular tubular frame 36 including integrally joined opposite sides 38 and opposite ends 40. The adjacent ends of the opposite end sections of the tubular member 20 are aligned and secured to the midportions of the ends 40 of the frame 36. One of the sides 38 of the frame 36 has a large radius generally U-shaped member 42 supported therefrom and the other side 38 has a smaller radius U-shaped member 44 secured thereto. The U-shaped members 42 and 44 open downwardly away from and are disposed in upstanding planes containing the sides 38.

The free ends of the U-shaped members 42 and 44 adjacent the outermost end 40 of the frame 36 are braced relative to the outer section of the tubular member 20 by means of a pair of diagonal braces 46 secured to the opposite side portions of the outer section of the tubular member 20 at one pair of corresponding ends and to the adjacent portions of the U-shaped members 42 at the other pair of corresponding ends thereof. In addition, a second pair of inclined brace members 48 are similarly secured between the inner end section of the tubular member 20 and the adjacent ends of the U-shaped members 42 and 44.

A flexible strap 50 of a suitable material such as canvas or an appropriate elastomeric material has its opposite ends secured to the end portions of the U-shaped member 44 as at 52. The strap 50 has an effective length less than the spacing along the U-shaped member 44 between the points of connection of the strap 50 to the U-shaped member 44. Accordingly, the midportion of the strap 50 is spaced from the midportion of the U-shaped member 44.

The outer end section of the tubular member 20 disposed outwardly of the inclined braces 46 defines a handle and in operation, after the holddown device 12 has been secured to the post 10, the animal 54 to be held down on the ground is first placed upon the ground in the general position illustrated in FIG. 1 of the drawings. Then, the holddown device 12 may be swung horizontally over the animal 54 and lowered into the position thereof illustrated in FIG. 1 of the drawings with the U-shaped members 42 and 44 embracingly engaging the upper surface portions of the animal 54. It will be noted that the strap 50 passes over the neck portion of the animal 54 and therefore that no rigid portions of the holddown device 12 engage the neck portion of the animal 54 and thereby injury to the animal 54 is prevented.

After the branding or innoculation operations performed on the animal 54 having been completed, the free end portion 18 of the lever 14 may be raised in order to free the animal 54 prior to the next animal being placed upon the ground.

Inasmuch as the end portion 18 is rotatable and extendible relative to the end portion 16, the U-shaped members 42 and 44 may be readily properly positioned relative to the animal 54 after the latter has been placed upon the ground in the general position thereof illustrated in FIG. 1 of the drawings.

With reference now more specifically to FIG. 6 of the drawings there may be seen a modified form of holddown device referred to in general by the reference numeral 12' and which is substantially identical to the holddown device 12 excepting that the mounting plate 28' thereof includes an outwardly projecting stub shaft portion 29 to which the end portion 16' corresponding to the end portion 16 is universally secured by means of a universal joint 31. Thus, the lever 14' of the holddown device 12' is also universally supported from the post 10.

With attention now invited more specifically to FIG. 4 of the drawings, it will be noted that a spacer (not shown) can be secured between the side 38 and the midportion of the U-shaped member 44 in order that the frame 36 may be horizontally disposed when in use in the manner illustrated in FIG. 4. Further, inasmuch as the opposite end portions of the end portion 18 are of the same diameter, if the animal 54 is disposed on the ground facing the other direction, the end of the end portion 18 remote from the tubular member 20 may be telescoped over the elongated lever 14 in lieu of the tubular member 20 whereby the frame 36 will be reversed end to end and the smaller U-shaped member 44 will be disposed at the right as viewed in FIG. 4 of the drawings. In this manner, the holddown device may also be utilized for branding on the left side of the animal.

In addition, any suitable means, other than the fasteners 52 may be utilized to secure the ends of the strap to the opposite ends of the U-shaped member 44 and with little modification the plate 28 could be supported from a three-point tractor hitch in lieu of the post 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An elongated lever combined with a mount, said mount being adapted for support from a stationary support, means universally attaching one end of said lever to said mount for movement of the other end of said lever in all directions transverse to a line extending between said mount and said other end of said lever, second means intermediate the opposite ends of said lever defining a recess opening outwardly of one side of said lever into which an animal body toward which the central portion is swung may be received.

2. The combination of claim 1 wherein said other end of said lever defines handle means.

3. The combination of claim 1 wherein said lever includes means for extending the length of said lever between said first and second means.

4. An elongated lever including first means at one end for universally attaching said one end to a stationary support, second means intermediate the opposite ends of said lever defining a recess opening outwardly of one side of said lever into which an animal body toward which the central portion is swung may be received, said lever including relatively telescopingly engaged opposite end portions, said first means being carried by one of said end portions and said second means being carried by the other of said end portions.

5. The combination of claim 4 wherein said relatively telescopingly engaged opposite end portions are also relatively rotatably engaged with each other.

6. An elongated lever including first means at one end for universally attaching said one end to a stationary support, second means intermediate the opposite ends of said lever defining a recess opening outwardly of one side of said lever into which an animal body toward which the central portion is swung may be received, said lever including opposite end portions rotatably supported from each other for relative oscillation about an axis extending longitudinally of said lever.

7. The combination of claim 1 wherein said second means defines a recess of elongated channel shape extending at generally right angles relative to the longitudinal centerline of said lever.

8. An elongated lever including first means at one end for universally attaching said one end to a stationary support, second means intermediate the opposite ends of said lever defining a recess opening outwardly of one side of said lever into which an animal body toward which the central portion is swung may be received, said second means including a pair of generally U-shaped members supported from said lever on opposite sides thereof defining an unobstructed channel extending therebetween.

9. The combination of claim 8 wherein one of said U-shaped members has a larger radius of curvature than the other U-shaped member.

10. The combination of claim 1 wherein said second means defines a recess of elongated channel shape extending at generally right angles relative to the longitudinal centerline of said lever and tapered in width and depth from one end thereof to the other end thereof.

11. An elongated lever including first means at one end for universally attaching said one end to a stationary support, second means intermediate the opposite ends of said lever defining a recess opening outwardly of one side of said lever into which an animal body toward which the central portion is swung may be received, said second means including a pair of generally U-shaped members supported from said lever on opposite sides thereof defining an unobstructed channel extending therebetween, one of said U-shaped members having a larger radius of curvature than the other U-shaped member, and an elongated flexible strap whose opposite ends are secured to inner surface portions of said other U-shaped member at points spaced therealong a greater distance than the effective length of said strap.

12. An elongated lever including first means at one end for universally attaching said one end to a stationary support, second means intermediate the opposite ends of said lever defining a recess opening outwardly of one side of said lever into which an animal body toward which the central portion is swung may be received, said first means comprising a mounting member adapted for stationary support from said support and a terminal end member on said one end, and an intermediate section pivotally supported from one of the members of oscillation about a horizontal axis and from the other of said members for oscillation about a vertical axis, said axes extending transversely of said elongated lever.

13. The combination of claim 12 wherein said intermediate section includes a horizontal shaft oscillatably supported from said mounting member and a generally radially outwardly projecting plate extending along one side of said shaft and to whose outer end portion said terminal end member is pivotally attached for oscillation about an axis disposed generally normal to said shaft.

14. The combination of claim 1 wherein said first means comprises a universal joint.

* * * * *